United States Patent
Varga et al.

[11] 3,875,798
[45] Apr. 8, 1975

[54] LEVEL INDICATING APPARATUS
[75] Inventors: Otto Hermann Varga; Brian M. Potter, both of Bradford-on-Avon, England
[73] Assignee: Richard Chadwick Greene, Mahwah, N.J.
[22] Filed: May 9, 1973
[21] Appl. No.: 358,624

Related U.S. Application Data
[63] Continuation-in-part of Ser. No. 232,059, March 6, 1972.

[30] Foreign Application Priority Data
May 9, 1972 United Kingdom............ 21582/72

[52] U.S. Cl.................................. 73/302; 73/407
[51] Int. Cl. ........................................ G01k 23/14
[58] Field of Search ............ 73/299, 406, 407, 302; 137/403, 82; 92/103 SD

[56] References Cited
UNITED STATES PATENTS
| | | | |
|---|---|---|---|
| 2,649,714 | 8/1953 | Griffith | 73/299 |
| 2,654,559 | 10/1953 | Franck | 92/103 SD |
| 3,161,051 | 12/1964 | Perry | 73/299 |
| 3,451,420 | 6/1969 | Bullivant | 73/299 |
| 3,456,509 | 7/1969 | Thordarson | 73/406 |

FOREIGN PATENTS OR APPLICATIONS
| | | | |
|---|---|---|---|
| 792,354 | 3/1958 | United Kingdom | 137/403 |
| 1,089,900 | 8/1967 | United Kingdom | |

Primary Examiner—Richard C. Queisser
Assistant Examiner—Denis F. Corr
Attorney, Agent, or Firm—Shoemaker and Mattare

[57] ABSTRACT

The invention provides liquid level indicating apparatus which includes a sensing element or capsule defining an interior space. Inlet valve means are arranged to control the supply of a pressure fluid to the interior of the sensing element and the interior of the sensing element is partly bounded by a first diaphragm on which the head of liquid acts. The first diaphragm is connected to the inlet valve in such manner that the pressure in the interior of the capsule reading can be rendered equal or proportional to the pressure generated by the head of liquid acting on the first diaphragm. The pressure in the sensing capsule may be recorded locally or remotely by a pressure indicating gauge. There are additionally provided means for venting the interior of the sensing element under the control of outlet valve means which are in turn connected to a second diaphragm acted upon by the head of liquid.

33 Claims, 11 Drawing Figures

LEVEL INDICATING APPARATUS

This invention relates to apparatus for measuring and indicating the level of a liquid.

This Application is a Continuation-in-part of my application Ser. No. 232,059 filed Mar. 6, 1972.

Broadly stated according to the present invention there is provided liquid level measuring and indicating apparatus including a sensing element having two diaphragms bounding a gas-filled interior space of the element, the two diaphragms being respectively coupled to control the operation of inlet and outlet valves which, in turn, respectively control the supply and exhaust of gas to and from said gas-filled interior space, characterised in that the two diaphragms constitute also at least part of the walls of a liquid-filled chamber which has liquid flow intercommunication only with a liquid, the hydrostatic pressure of which is to be measured, and including means interconnecting said gas-filled interior space with a pressure indicating gauge so as to indicate the gas pressure in said gas-filled interior space.

Apparatus according to the invention may be employed to measure liquid levels in any type of impoundment, or even sea level.

The sensing element may be located either inside or outside a liquid container.

The immediately preceding description refers to a liquid under atmospheric pressure. If, however, a container is under pressure the air pressure generated in the sensing capsule will be equal or proportional to the sum of gas or vapour pressure in the container plus the pressure due to the head of liquid above the sensing capsule. In this case the pressure from the capsule is conveniently taken to a different type manometer which records the difference between the pressure developed in the capsule and the vapour, air or gas pressure in the tank above the liquid level. The differential reading thus obtained will be a measure of the liquid level above the sensing capsule.

The sensing capsule itself essentially consists of a housing with two diaphragms which may be deflected either inwards or outwards by pressure differences acting upon them between the inside and outside space. The diaphragms may be of metal or rubber or a synthetic plastics material such as polytetrafluoroethylene (p.t.f.e.) according to the type of application. In the case of metal diaphragms, stainless steel and copper alloy sheet may be convenient materials of construction. The diaphragms will have a neutral position in which the capsule pressure may actually be equal to the hydrostatic pressure acting on the diaphragms or it may be in small degree more or less than the hydrostatic pressure.

The two diaphragms now perform separate and distinct duties. One diaphragm acts to control air admission valve while the other diaphragm acts to control an exhaust valve. Both diaphragms in their netral position substantially shut off the respective valve which they are controlling. This neutral position is such that the pressure internally and externally on the diaphragm are equal, or differ by a small amount, so as to cause the diaphragm to exert a force on its associated valve just sufficient to close same to seal off flow therethrough.

The valves operated by the diaphragms may be of small bore, such that the force generated by the pressure of air in the valve nozzle is relatively very small in the force balance of the diaphragm produced between pressure in the enclosure or capsule and the hydrostatic pressure.

Alternatively, the valves may be of the force-balance type requiring nil, or only very little diaphragm effort to operate them.

Thus the exhaust valve may be in the form of a small nozzle situated inside the capsule, and so located that in the neutral position of the exhaust diaphragm, a small rubber seal in the centre of the diaphragm effectively shuts off the capsule space from the exhaust nozzle.

When this exhaust diaphragm is deflected into the capsule space from its neutral position by the excessive hydrostatic pressure on the outside, it will only serve to increase sealing pressure on the exhaust nozzle, through which thus no air can flow out. When the pressure in the capsule, however, is larger than that corresponding to the neutral position of the diaphragm, the exhaust diaphragm deflects outwards from its neutral position and will allow the seal on the exhaust valve nozzle to open so as to allow air to escape from the capsule, usually to atmosphere.

The action of the inlet diaphragm is the opposite to that of the exhaust diaphragm. It is arranged to cooperate with a small inlet valve in such a manner that in the neutral position of the diaphragm the inlet valve is substantially closed. When the diaphragm deflects towards the capsule space from its neutral position as a result of excessive hydrostatic pressure, it will allow the inlet valve to open so as to admit compressed air into the capsule until, the correct balancing pressure is reached to return the inlet diaphragm to its neutral position, as above defined, at which the inlet valve is again closed. If the pressure in the capsule is greater than that corresponding to the neutral pressure of the inlet diaphragm this will tend to pull the inlet valve harder into sealing engagement with its seat.

It will be appreciated that by the interplay of the inlet and exhaust diaphragms a sensing pressure will be set up in the capsule which corresponds exactly to the hydrostatic pressure obtained in the tank, multiplied by a factor depending upon whether the diaphragms are direct acting straight balancing units or whether they are of composite construction producing a pre-determined pressure ratio between the inside and outside of the capsule.

So far the use of compressed air has been mentioned as the indicating medium, but obviously other media may be used such as steam which may be convenient in some cases. Compressed air is likely to be convenient in many applications and either it may be obtained from an available source of air supply, or it may be provided by means of a separate small pump or fan unit for the purpose of operating the liquid level indicating device. In many cases the supply of 15 PSI (pounds per square inch) air may be used for the gauge indication, as this is widely used as a signal pressure in the automatic control of valves and process plant. The manometers indicating the sensing pressure may be of the Bourdon tube type, or they may be open or closed U-type tubes using fluid as an indicating means, or they may consist of other pressure indicating elements of known kind.

The device as so far described essentially incorporates an inlet and outlet valving arrangement into the capsule, each controlled by a diaphragm exposed on the one side to the hydrostatic pressure of the liquid head to be measured and on the other side to the pressure in the capsule. The two diaphragms and the associated valves control the in and out flow of fluid to and from the capsule so as to adjust the pressure in it to correspond directly or proportionally to the hydrostatic pressure of the liquid to be measured.

The present invention is particularly directed towards such a pressure sensitive capsule construction with the following objectives:

1. To render the enclosure or capsule construction one which is sealed and does not require a permanent bleed of compressed air through it, but only requires a source of compressed air for topping up purposes.
2. To specify more precisely the tank depth which is recorded by the capsule pressure and to define and limite the error to which such capsule pressure reading may be subject.

The above objectives are achieved by two sets of constructional features:

a. Both inlet and outlet valves are described are now envisaged as being designed to provide complete and reliable shut-off with light contact pressure only.
b. Special consideration has been given to the spatial relationship of the inlet and outlet diaphragms in the capsule construction and in particular the height relationship of the two diaphragms.

It will be described presently how by choosing the right height position of the inlet diaphragm relative to the outlet diaphragm, it can be ensured that both the inlet and outlet valves will reliably seal off and also that the pressure set up in the capsule will lie between predetermined limits corresponding to the hydrostatic pressure of the column of liquid measured to specific depth limits positioned between the inlet and outlet diaphragms.

Dealing with the first design feature just enumerated the inlet and outlet valves according to this specification are designed with soft or semi-soft sealing devices such as rubber seals and O-rings, in such a manner that complete and reliable shut-off can be achieved with light contact pressure. Amongst the devices may be employed any particular rubber seal of the self-sealing type, such as an O-ring and and also a profiled rubber disc for example as described in British Patent Specifications No. 1,039,401 and 1,089,900. These self-sealing devices have the property that the fluid pressure itself serves to produce a liquid tight seal between the mating parts of the shut-off valve with hardly any direct pressure between these parts.

With regard to the second feature described, i.e. the accurate control of the pressure developed in the enclosure or capsule, it is an essential requirement of the present application that the inlet diaphragm should be placed at a lesser depth in the tank than the outlet diaphragm. As will be shown, by carefully spacing the inlet diaphragm higher relative to the outlet diaphragm, the pressure set up and retained in the capsule will be that corresponding to a certain intermediate depth between the two diaphragms.

According to one embodiment of the invention a sensing element having two diaphragms is enclosed in a casing or envelope which is in fluid flow communication only with the interior of the liquid whose level is to be measured, so that the hydrostatic pressure of the head of liquid above the sensing element can be transmitted to the interior of the casing and so brought to bear on the two diaphragms.

According to a second, and preferred, embodiment of the invention the sensing element has its two diaphragms facing one another, partly to define the walls of a liquid-filled chamber disposed between the diaphragms, which chamber is placed in direct fluid flow communication only with the liquid the level of which is to be measured.

In this second embodiment, preferably one diaphragm is located above the other and the upper diaphragm is coupled to the inlet valve which, in turn, controls the supply of gas to the gas-filled interior space, while the other lower diaphragm is coupled to control the outlet valve which, in turn, controls venting of gas from the gas-filled interior space.

In this embodiment the inlet valve is located above the upper diaphragm and the outlet valve is located below the lower diaphragm with the gas-filled spaces, respectively, above the upper diaphragm and below the lower diaphragm, being interconnected by air passage means.

In all embodiments the gas-filled interior space will be connected by an air line to a gas pressure indicating device.

If sensing element is located at a pre-determined known height relative to any container, the level of whose liquid content is to be measured, then by appropriate correction of the reading of the pressure indicating device a substantially accurate indication of the liquid level in the container can be obtained.

Preferably both diaphragms are disposed substantially horizontally.

The accuracy which can be achieved by the liquid level measuring and indicating apparatus also depends on a number of design factors and calculations, among which may be mentioned:

a. The density of the liquid
b. The effective area of the two diaphragms
c. The forces required to seal off the inlet and the outlet valves respectively.
d. The sizes of the inlet and outlet valve orifices respectively.
e. The gas supply pressure at the orifice of the inlet valve.
f. The mathematical relationships of the above and other factors which are fully discussed later in the Specification.

One embodiment of the invention will be described by way of example with reference to the accompanying drawings in which:

FIG. 1 is a cross-sectional view of a liquid level sensing capsule according to the invention shown fitted to the wall of a liquid level tank FIG. 2 is a cross-sectional view taken on the lines II—II of FIG. 1, while FIG. 3 is a diagramatic representation of a liquid container or tank fitted with a sensing capsule according to the invention and showing connections to other elements required to complete the liquid level indicating apparatus.

Figure 1:
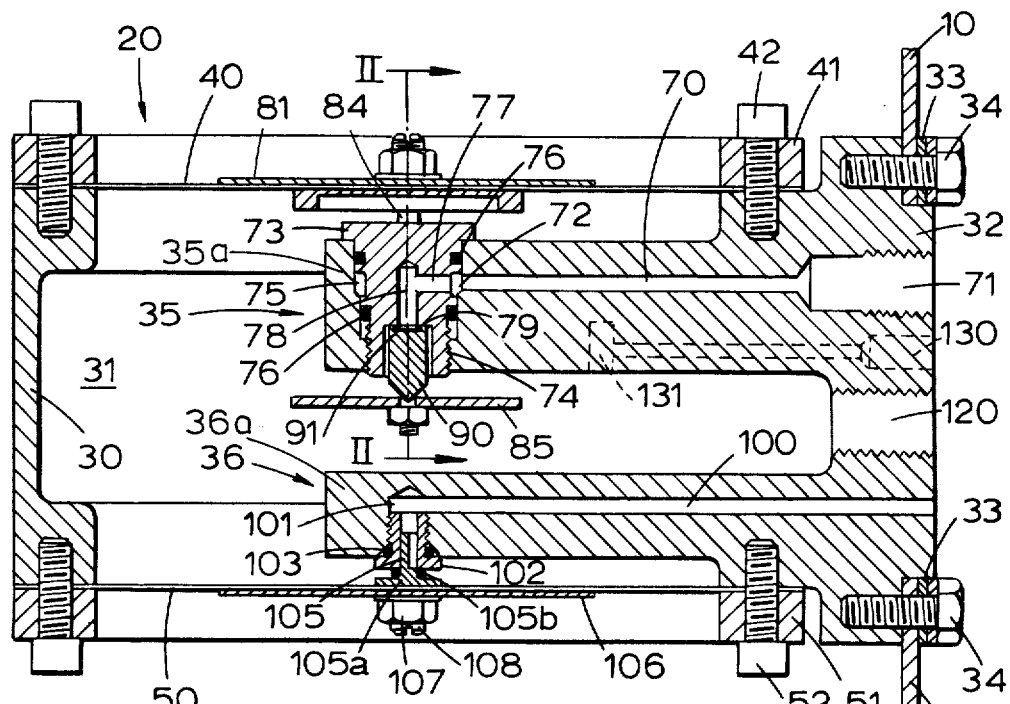
Figure 3:
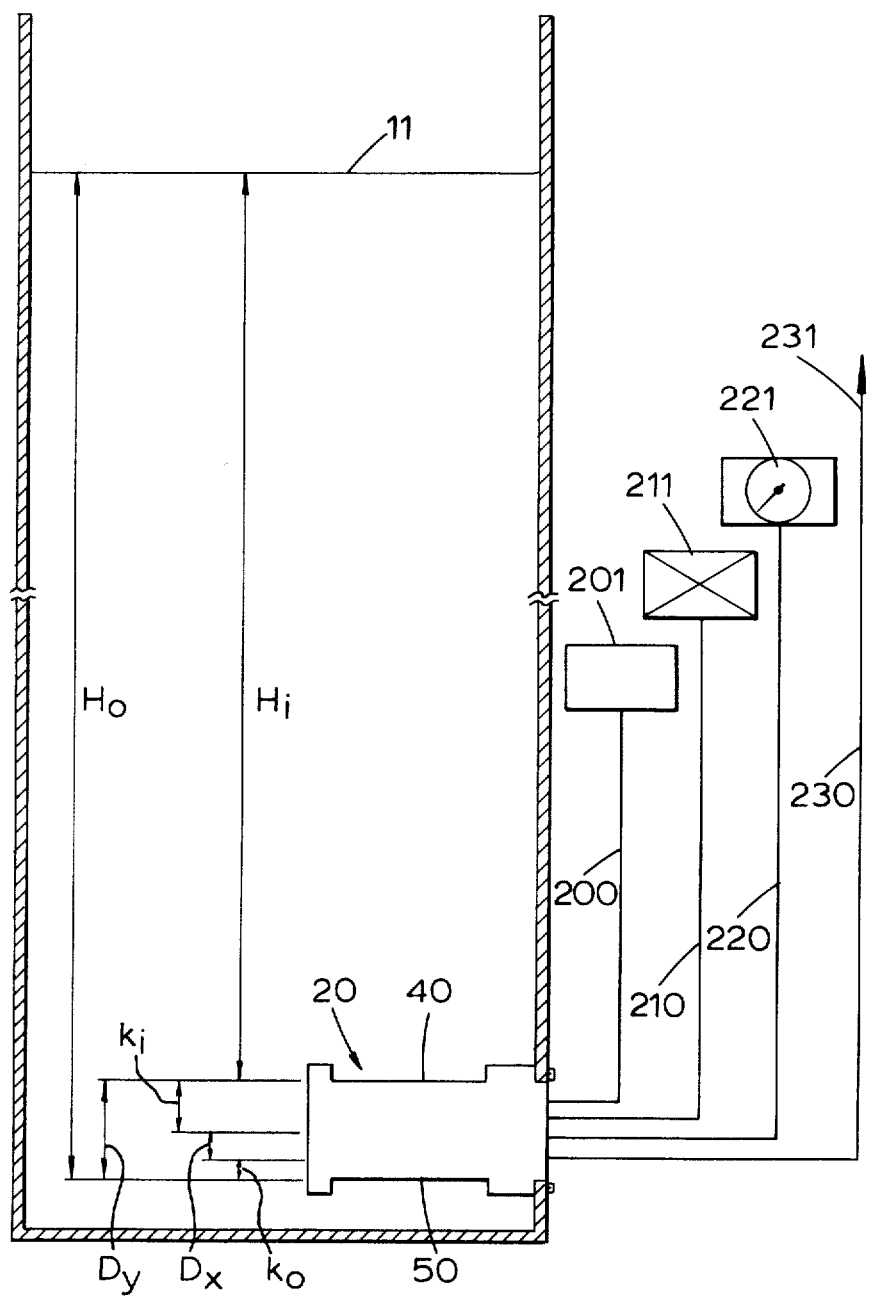

Referring now to the drawings and first more particularly to FIG. 1, 10 represents a wall of a liquid container or tank, the level of liquid in which may vary, a particular level being indicated for example at 11 in FIG. 3. Towards a lower level of the tank an aperture is formed in wall 10 to which is secured a level sensing element or capsule according to the invention which is generally designated 20.

The sensing element 20 will first be described in broad outline and later in greater detail.

Basically the element 20 may comprise a hollow main body portion 30 defining an interior space generally designated 31 which has an open upper end closed by a diaphragm 40 and an open lower end closed by a diaphragm 50.

Alternatively it may comprise two chambers, one closed by diaphragm 40 the other by the diaphragm 50, the two chambers being interconnected to form a single enclosure defining the interior space 31.

Preferably for reasons which will be apparent from the following description the diaphragms 40 and 50 are circular so that their effective area may be accurately determined. Accordingly the upper and lower opendings in the hollow body are like wise circular, the body 30 together with the diaphragm 40 and 50 defining the space 31 which may be of any convenient shape. The diaphragm 40 and 50 are clamped to the open ends of the body 30 by rings 41 and 51 respectively and screws 42 and 52 respectively.

Main body portion 30 has a boss 32 suitably shaped to fit in the aperture formed in wall 10. 33 represents sealing washer means sealing boss 32 of main body 30 against wall 10 while 34 represents securing bolts passing through holes in wall 10 and engaging threaded recesses in main body 30.

Main body 30 has projecting inwardly of space 31 an inlet valve housing 35a for an inlet valve generally designated 35 and an outlet valve housing 36a for an outlet valve generally designated 36.

The inlet valve housing has a longitudinally extending bore 70 leading from a threaded opening 71 formed in boss 32 of the main body portion 30.

The bore 70 extends from the threaded opening 71 to terminate in an opening 72. 73 represents a threaded plug inserted in an opening in the housing 35a and engaging a threaded portion 74 of such opening.

Plug 73 is formed with a gallery 75 which communicated with bore 70, 76 representing O-rings sealing the plug against the housing 35a on opposite sides of the gallery 75. The gallery 75 communicates with a bore 77 in the plug leading to a further bore 78 formed axially in the plug 73.

Figure 2:
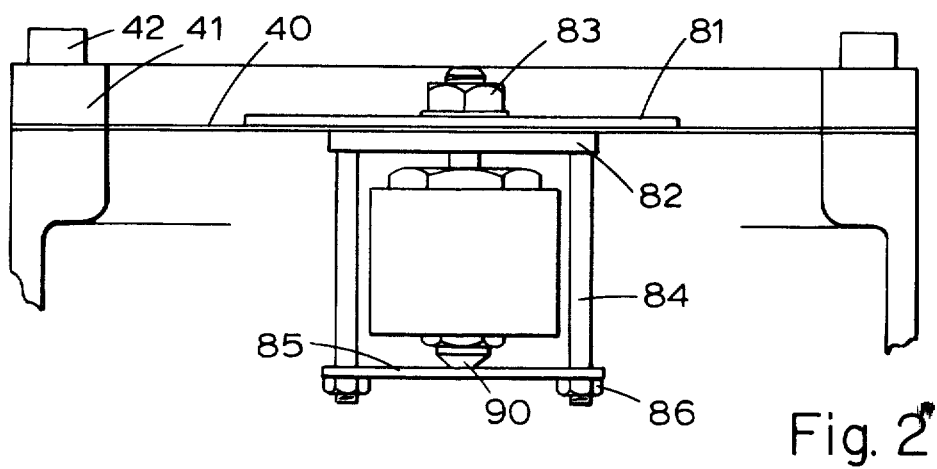

Referring now to FIG. 2, the diaphragm 40, in its central region, is clamped between an upper disc 81 and a saddle 82 by means of nut and bolt elements 83. Saddle 82 has depending legs 84 to the lower end of which is secured a plate 85 by means of nuts 86. As will be clear from FIG. 2 the plate 85 moves together with the central region of the diaphragm 40.

Referring again to FIG. 1 the lower end of bore 78 is enlarged to form a seat 79, against which bears a valving member 90. At its upper end, the valving member 90 carries a deformable sealing element 91 preferably of the kind described in British Patent Specification No. 1,089,900 and which is adapted to seal against the seat 79.

In the embodiment shown the valving element 90 has a conically pointed lower end, the apex of which engages in a recess in plate 85.

Bore 70 is adapted to be supplied by gaseous fluid, under pressure, from a gluid line connected to threaded opening 71. When the central region of the diaphragm 40 moves outwardly so as to increase the volume of space 31, the plate 81 will exert upward pressure on plate 85 holding valve member 90 upwardly with sealing member 91 tending to shut off supply, by sealing with seat 79. On the contrary, when the central region of diaphragm 40 moves inwardly of main body 30 of the capsule it will take with it plate 85, releasing pressure from valve member 90 and enabling pressure fluid to flow from bore 70 through the inlet valve into the interior space 31.

Outlet valve housing 36a has a bore 100 leading from boss 32 of main housing 30. The bore 100 may communicate direct with atmosphere or if desired boss 32 may be formed with a threaded hole to which a discharge pipe may be connected communicating with bore 100.

Formed transversely in outlet valve housing 36a is a threaded bore 101 receiving a plug 102 sealed by O-ring 103. The plug 102 is hollow, its hollow interior communicating with bore 100. 105 represents a valving member having an enlarged head 105a. 105b is an O-ring effecting sealing between the enlarged head 105a of the valve member 105 with the plug 102.

The diaphragm 50 has in its central region sandwiched between disc 106 and the enlarged head 105a of valve member 105 and secured by a nut 107 threaded on an extension 108 of valve member 105.

The construction and operation of the outlet valve 35 is such that when the diaphragm 50 is urged inwardly of the space 31, outlet valve member 105 with its enlarged head portion 105a will be urged towards sealing engagement with plug 102. On the other hand, when the central region of diaphragm 50 moves outwardly of the space 31, the enlarged head portion 105a and the valve member 105 will be moved away from the plug 102 tending to enable fluid to escape from space 31 with bore 100, which constitutes a vent passage and which preferably communicates directly or indirectly with atmosphere.

The body 30 has a further threaded opening 120 in its boss 32. To this opening 120 is connected a line leading to a manometer or pressure gauge 221 (Flg. 3). Optionally, the body 30 may contain a further bore system shown in dotted lines at 130 and 131 leading from boss 32 and to which may be connected a line 210 leading to a blow off or safety valve 211 (FIG. 3) as will be referred to herebelow.

The disc 81 of the inlet diaphragm 40 and the disc 106 of the outlet diaphragm 50 serve to support the central regions of their respective diaphragms.

Further support for the diaphragms may be provided by a grid disposed internally of each diaphragm and spaced a short distance therefrom. This will protect the diaphragm against excessive inward deflection occasioned by loss of pressure internally of the capsule.

Referring now to FIG. 3, 10 again represents a wall of the tank or container and 20 again generally represents the pressure sensing element mounted therein.

200a represents a line leading from inlet bore 70 and its threaded opening 71 and a source of pressure 201 which may be a hand pump or a continuous supply of pressure.

210 represents a line which may optionally be supplied extending between the bore 130 indicated in dotted lines in FIG. 1 and safety valve 211 which will be designed to vent interior space 31 in the event of excess pressure being generated therein.

The valve 211 may be arranged to vent the interior space 31 when pressure within the space exceeds by a specified amount the pressure exerted by the head of liquid in the container on the diaphragm 40.

220 in FIG. 3 represents a line extending between the threaded opening 120 and a manometer gauge 221.

Finally 230 represents a line extending between bore 100 and an exhaust to atmosphere represented at 231.

Where the sensing element 20 is charged by a hand pump or other intermittent supply, it is necessary to provide a non-return valve in the duct to the inlet valve, so that when the inlet valve opens as a result of excess hydrostatic pressure on the inlet diaphragm 40, fluid under pressure cannot escape from the space 31 through the inlet line in the absence of a pressure supply.

Also the vent and manometer passages can conveniently be equipped with excess flow shut-off valves which would seal if the liquid whose level is to be measured tended to flow through them as a result of one or other diaphragm breaking or perforating. Such a precaution may not be necessary in the case of atmospheric tanks, if the vent and manometer lines are taken above the liquid level in the tank.

To understand the importance of the height relationship between the inlet and outlet diaphragms 40 and 50, it is of interest to analyse mathematically taking for each diaphragm on its own the pressure in space 31 which would be required to act on it to ensure the effective shut-off of the inlet or outlet valve 35 or 36 ofr a given head of liquid above each diaphragm 40 or 50 and a given air supply pressure.

Taking the outlet diaphragm 50 first, the relation between the sealing pressure in the sensing element and the liquid head can be expressed as follows:

$$h_o = H_o - k_o$$

where $k_o$ is given by $$k_o = \frac{P_o}{wA_o} \left[ 1 + \frac{a_o}{A_o} \right] - \frac{H_o a_o}{A_o}$$

the meaning of the symbols is as follows:
$H_o$ = liquid height above outlet diaphragm 50
$h_o$ = liquid head corresponding to shutting-off pressure in the space 31 on outlet diaphragm 50
$w$ = density of liquid
$P_o$ = force required to seal off outlet valve 35
$A_o$ = effective area of outlet diaphragm 50
$a_o$ = area of outlet valve orifice (e.g. the contact annular of O-ring 105b)

For inlet diaphragm 40, the required capsule pressure to seal off the inlet valve is given by:

$$h_i = H_i + k_i$$

where $k_i$ is given by $$k_i = \frac{P_i + p_i a_i}{wA_i}$$

Where:
$P_i$ = force required to seal off the inlet valve
$P_i$ = air supply pressure at inlet valve orifice (e.g. seat 79)
$a_i$ = area of inlet orifice (e.g. seat 79)
$h_i$ = liquid head corresponding to shut-off pressure in space 31 on the inlet diaphragm 40
$H_i$ = the head of liquid above the inlet diaphragm 40
$k_i$ = the small head indicated in FIG. 3 corresponding to the pressure required to close the inlet valve
$A_i$ = effective area of inlet diaphragm 40

Some of the above are indicated in FIG. 3 of the drawings.

The two formulae show that for complete shut-off of the outlet valve 36 the pressure obtaining in the interior space 31 must be that corresponding to the head of liquid above the outlet diaphragm less a small head $k_o$, as given.

For the inlet diaphragm 40 the pressure in space 31 necessary to shut-off the inlet valve is that corresponding to the head of liquid above the inlet diaphragm, plus a small head $k_i$, as given above. It therefore follows that if the difference in depth between the inlet and outlet diaphragms is made more than $(k_o + k_i)$, both diaphragms 40 and 50 will effectively seal their valves 35, 36 and the pressure obtained in the space 31 will be one corresponding to a liquid head between a lower limit $(H_i + k_i)$ and an upper limit $(H_o - k_o)$. If now the sensing element is so designed that the height of the inlet diaphragm 40 above the outlet diaphragm 50 exceeds $(k_i + k_o)$ by only a small amount, then the effective liquid depth recorded will be that in the narrow band Dx by which the height Dy of the inlet diaphragm 40 above the outlet diaphragm 50 exceeds the sum $(k_i + k_o)$. The total potential range of error of the reading thus obtained will be $Dx = Dy - (k_i + k_o)$.

By carefully designing the diaphragms and valves in such a way that both the heads $k_i$ and $k_o$ are kept small, and further placing the diaphragms relative to each other so that the quantity $Dx = Dy - (k_i + k_o)$ is kept as small as desired, the accuracy achieved on the pressure sensing element can be brought within any desired limits.

The expressions for $k_o$ and $k_i$ apply essentially to the valve arrangement as shown in FIG. 1. Also they assume that the diaphragm has no stiffness and offers no resistance of its own to small deflections. Where the diaphragms have some stiffness, appropriate terms to allow for this must be inserted into the expressions $k_o$, $k_i$. Furthermore, alternative arrangements of associatively connecting the valves with the diaphragms are possible and the formulae for $k_o$ and $k_i$ may be further modified as a result. Indeed the inlet valve may be, for example, of a force balance type with partial, complete or over compensation. As a consequence $k_i$ could become zero or even negative. In all cases, however, a self sealing sensing element 20 will be achieved if it is so constructed that $(H_i + k_i)$ is less than $(H_o - k_o)$, with the brackets being taken in their algebraic sense, and $k_i$ and $k_o$ being able to assume positive or negative values.

Also it may be convenient to employ spring means to assist or counterbalance the actions of the diaphragms on the valves to compensate for gravitational or other forces. The effect of such springs and of such gravitational or other forces must again be allowed for the expressions for $k_o$ and $k_i$.

Figure 4:
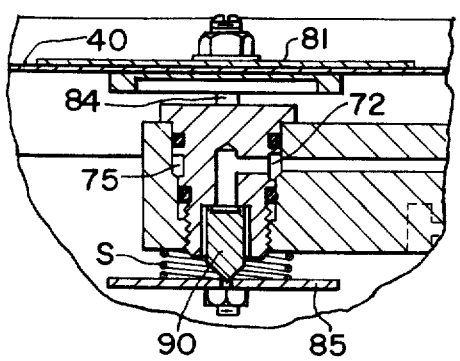
FIG. 4 is an enlarged fragmentary sectional view of a modification in which a spring aids in opening the inlet valve.

For example, in FIG. 4, a spring S is engaged between the valve housing 35a and plate 85 and enables valve 90 to open even though the interior pressure is greater than the exterior pressure.

It will be noted from the mathematical analysis above that the small heads $k_i$ and $k_o$ depend mainly upon the required seating forces of the inlet and outlet valves 35 and 36 and the size of the diaphragms 40 and 50, and these terms are independent of the height of liquid in the tank. There are however some additional terms in the expressions of $k_i$ and $k_o$ which are dependent on the height of liquid, and therefore in designing a sensing element according to this invention to provide readings within pre-dertermined limits of error, not only must the design of the inlet and outlet valves 35 and 36 as well as the supply pressure be considered, but also the maximum liquid height which a particular sensing element 20 is designed to record.

From the above description, it can be seen that a liquid level sensing element 20 according to the present invention can be designed to give accurate readings of level to a certain depth relative to the inlet and outlet diaphragms 40 and 50 within any required degree of accuracy. Also by arranging the sensing element 20 to function with both inlet and outlet valves 35 and 36 which are able to shut-off completely no continuous air bleed through the device is required to obtain readings. Indeed, it is possible to pump up the capsule to the required pressure when the container 10 is full of liquid, and then leave the sensing element without any further air supply, allowing it to adjust itself to a continuous dropping pressure by allowing air to escape as and when the liquid level in the container 10 falls.

Obviously whenever the liquid level rises in the container 10, further air has to be supplied to the sensing element 20 to enable it to maintain its proper depth reading. This can be done by providing a permanent or intermittent compressed air supply to the sensing element 20, or by means of any convenient hand pump device.

Reverting once more to the mathematical analysis, it is worthwhile mentioning that if the height $Dy$ between the inlet and outlet diaphragms is less than the sum $(k_i + k_o)$, or more generally if $(H_o - k_o)$ is less than $(H_i + k_i)$ again with the brackets taken in their algebraic sense, and with $k_i$ and $k_o$ being able to assume positive or negative values, the diaphgrams will not shut-off their respective valves, and a continuous air bleed will take place through the sensing element. The pressure in the sensing element 20 will then adjust itself to correspond to a liquid depth intermediate between the inlet and outlet diaphgrams, so arranged that the mass of air flowing into the sensing element through the inlet valve 35 exactly counterbalances the mass of air flowing through the outlet valve 36 to atmosphere. Clearly in this alternative method of functioning by making $Dy$ suitably small, the capsule can also be made to give a useful indication of liquid depth, but the continuous air bleed requirement clearly uses up some power and makes a provision of a permanent source of compressed air essential, which need not be the case if the capsule is designed as a self-sealing unit according to the criteria described above.

Figure 5:
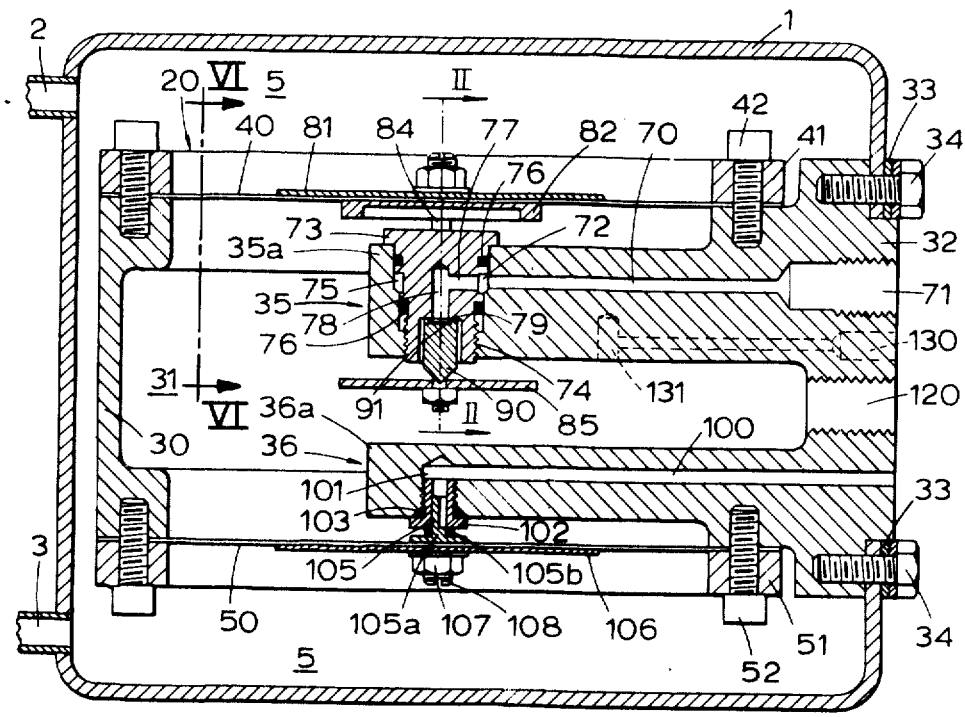
FIG. 5 is a cross-sectional view of a liquid level sensing element according to a first embodiment in which a sensing element is enclosed in an air tight casing.
Figure 6:
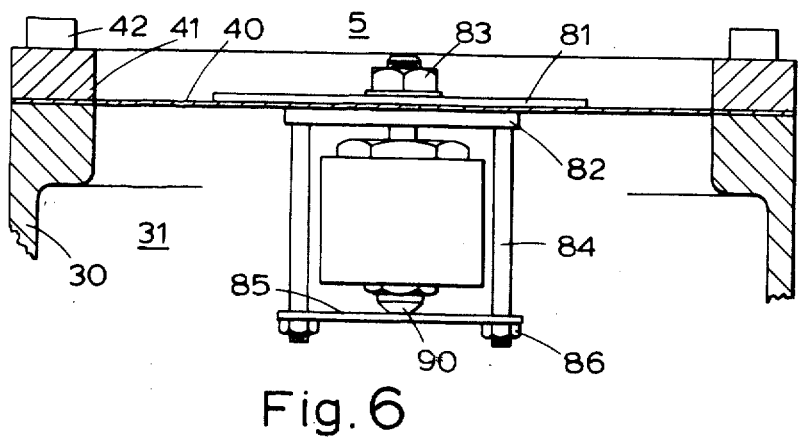
FIG. 6 is a view taken on lines VI—VI of FIG. 5.
Figure 7:
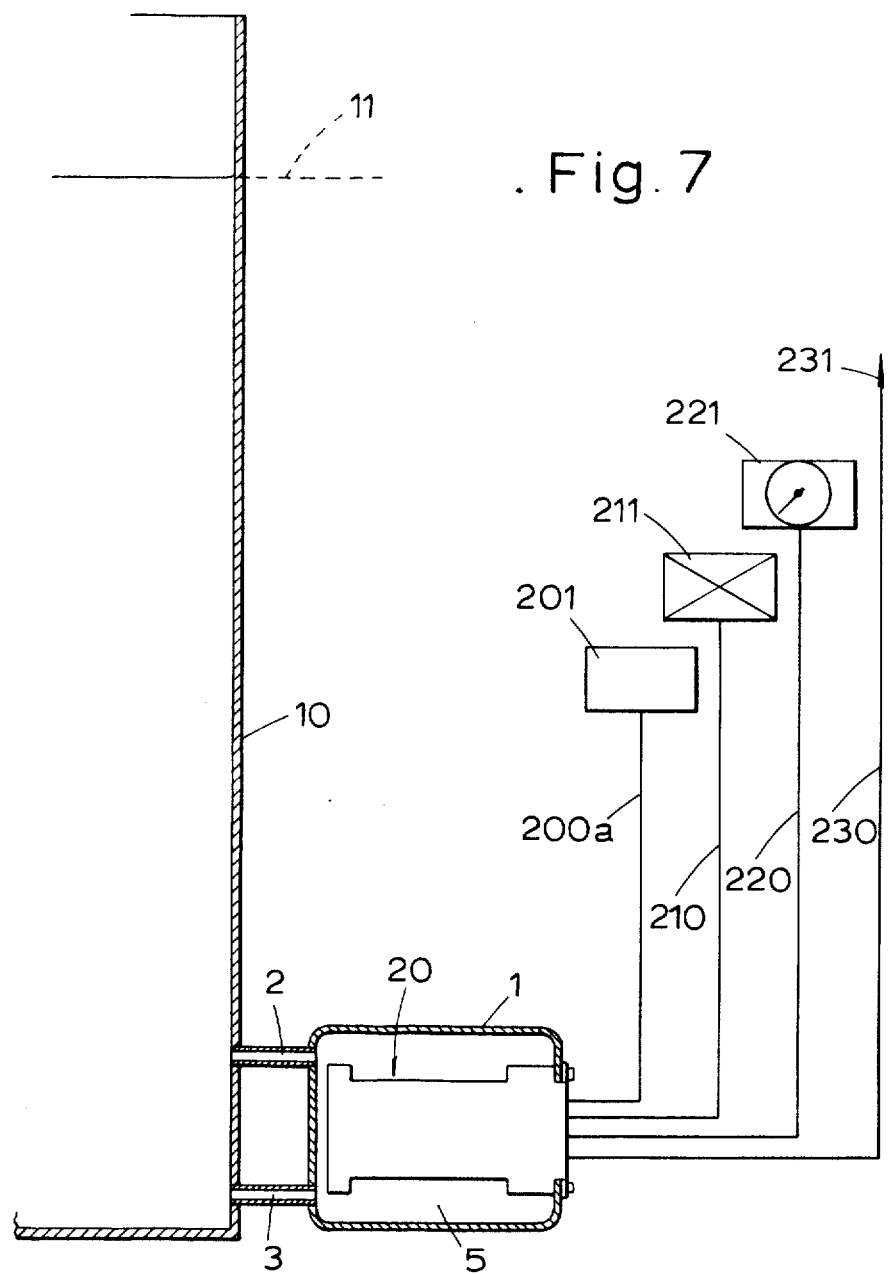
FIG. 7 is a diagramatic representation of a liquid container or tank fitted with a sensing element of the kind shown in FIGS. 5 and 6 and showing connections to other elements required to complete the entire liquid level indicating apparatus.

In FIGS. 5, 6 and 7 of these drawings similar reference numerals are employed for like or equivalent parts which have already been described with reference to FIGs. 1 to 4.

Referring now to FIg. 7, 10 represents a wall of a liquid container or tank, the level of liquid in which may vary, a particular level being indicated for example at 11. Towards a lower level of the tank at least one aperture is formed in wall 10 by which a level sensing element or capsule which is generally designated 20 is connected to the tank.

The sensing element 20 shown in FIGS. 5 and 6 will first be described in broad outline and later in greater detail.

Basically the element 20 comprises a hollow main body portion 30 defining an interior gas-filled space generally designated 31 which has an open upper end closed by a diaphragm 40 and an open lower end closed by a diaphragm 50.

Alternatively it may comprise two chambers, one closed by diaphragm 40 and the other by the diaphragm 50, the two chambers being interconnected to form a single enclosure defining the interior space 31.

Preferably, the diaphragms 40 and 50 are circular so that their effective area may be accurately determined. Accordingly the upper and lower openings in the hollow body 30 are likewise circular. The body 30 together with the diaphragms 40 and 50 defining the interior gas-filled space 31 may be of any convenient shape. The diaphgrams 40 and 50 are clamped to the open ends of the body 30 by rings 41 and 51 respectively and screws 42 and 52 respectively.

1 represents an envelope or casing enclosing the sensing element generally designated 20.

The main body portion 30 has a boss 32 suitably shaped to fit an aperture formed in the wall of the casing 1. 33 represents sealing washer means sealing boss 32 of main body 30 against the wall of casing 1, while 34 represents securing bolts passing through holes in the wall of casing 1 and engaging threaded recesses in main body 30.

2 and 3 represent conduit pipes providing fluid flow intercommunication between the liquid-filled interior space 5 of the casing 1 and the interior of the container air tank 10.

Main body 30 has projecting inwardly of space 31 an inlet valve housing 35a for an inlet valve generally designated 35 and an outlet valve housing 36a for an outlet valve generally designated 36.

The inlet valve housing has a longitudinal extending bore 70 leading from a threaded opening 71 formed in boss 32 of the main body portion 30.

The bore 70 extends from the threaded opening 71 to terminate in an opening 72. 73 represents a threaded plug inserted in an opening in the housing 35a and engaging a threaded portion 74 of such opening.

Plug 73 is formed with a gallery 75 which communicates with bore 70. O-rings 76 seal the plug against the housing 35a on opposite sides of the gallery 75. The gallery 75 communicates with a bore 77 in the plug leading to a further bore 78 formed axially in the plug 73.

Referring now to FIG. 6 of the diaphragm 40, in its central region, is clamped between an upper disc 81 and a saddle 82 by means of nut and bolt elements 83. Saddle 82 has depending legs 84 to the lower end of which is secured a plate 85 by means of nuts 86. As will be clear from FIG. 6 the plate 85 moves together with the central region of the diaphragm 40.

Referring again to FIG. 5 the lower end of bore 78 is enlarged to form a seat 79, against which bears a valving member 90. At its upper end, the valving member 90 carries a deformable sealing element 91, preferably of the kind described in British Patent Specification No. 1,089,900 and which is adapted to seal against the seat 79.

In the embodiment shown the valving element 90 has a conically pointed lower end, the apex of which engages in a recess in plate 85.

Bore 70 is adapted to be supplied by gaseous fluid, under pressure, from a fluid line connected to threaded opening 71. When the central region of the diaphragm 40 moves outwardly so as to increase the volume of space 31, the plate 81 will exert upward pressure on plate 85 holding valve member 90 upwardly with sealing member 91 tending to shut off supply, by sealing with seat 79. On the contrary, when the central region of diaphragm 40 moves inwardly of main body 30 of the capsule it will take with it plate 85, releasing pressure from valve member 40 and enabling pressure fluid to flow from bore 70 through the inlet valve into the space 31.

Outlet valve housing 36a has a bore 100 leading from boss 32 of main housing 30. The bore 100 may communicate direct with atmosphere or if desired boss 32 may be formed with a threaded hole to which a discharge pipe may be connected communicating with bore 100.

Formed transversely in outlet valve housing 36a is a threaded bore 101 receiving a plug 102 sealed by O-ring 103. The plug 102 is hollow, its hollow interior communicating with bore 100. 105 represents a valving member having an enlarged head 105a. 105b is an O-ring effecting sealing between the enlarged head 105a of the valve member 105 with the plug 102.

The diaphragm 50 has in its central region sandwiched between disc 106 and the enlarged head 105a a valve member 105 and secured by a nut 107 threaded on an extension 108 of valve member 105.

The construction and operation of the outlet valve 35 is such that when the diaphragm 50 is urged inwardly of the space 31, outlet valve member 105 with its enlarged head portion 105a will be urged upwardly and with O-ring 105b being urged towards sealing engagement with plug 102. On the other hand, when the central region of diaphragm 50 moves outwardly of the space 31, the enlarged head portion 105a and the valve member 105 will be moved away from the plug 102 tending to enable fluid to escape from space 31 into bore 100, which constitutes a vent passage and which preferably communicates directly or indirectly with atmosphere.

The body 30 has a further threaded opening 120 in its boss 32. To this opening 120 is connected a line leading to a manometer or pressure gauge 221 (FIg. 7). Optionally, the body 30 may contain a further bore system shown in dotted lines at 130 and 131 leading from boss 32 and to which may be connected a line leading to a blow off or safety valve 21 (FIG. 7) as will be referred to herebelow.

The disc 81 of the inlet diaphragm 40 and the disc 106 of the outlet diaphragm 50 serve to support the central regions of their respective diaphragms.

Further support for the diaphragms may be provided by a grid disposed internally of each diaphragm and spaced a short distance therefrom. This will protect the diaphragms against excessive inward deflection occasioned by loss of pressure internally of the capsule.

Referring now to FIG. 7, 200a represents a line leading from inlet bore 70 and its threaded opening 71 and a source of pressure 201 which may be a hand pump or a continuous supply of pressure.

210 represents a line which may optionally be supplied extending between the bore 130 indicated in dotted lines in FIG. 5 and safety valve 211 which will be designed to vent interior space 31 in the event of excess pressure being generated therein.

The valve 211 may be arranged to vent the interior space 31 when pressure within the space exceeds by a specified amount the pressure exerted by the head of liquid in the container on the diaphragm 40.

220 in FIG. 7 represents a line extending between the threaded opening 120 and a manometer gauge 221.

Finally 230 represents a line extending between bore 100 and an exhaust to atmosphere represented at 231.

Where the sensing element 20 is charged by a hand pump or other intermittent supply, it is necessary to provide a non-return valve in the duct to the inlet valve, so that when the inlet valve opens as a result of excess hydrostatic pressure on the inlet diaphragm 40, fluid under pressure cannot escape from the space 31 through the inlet line in the absence of a pressure supply.

Also the vent and pressure indicating gauge passages can conveniently be equipped with excess flow shut-off valves which would seal if tank liquid tended to flow through them as a result of one or other diaphragm breaking or perforating. Such a precaution may not be necessary in the case of atmospheric tanks, if the vent and manometer lines are taken above the liquid level in the tank.

Figure 8:
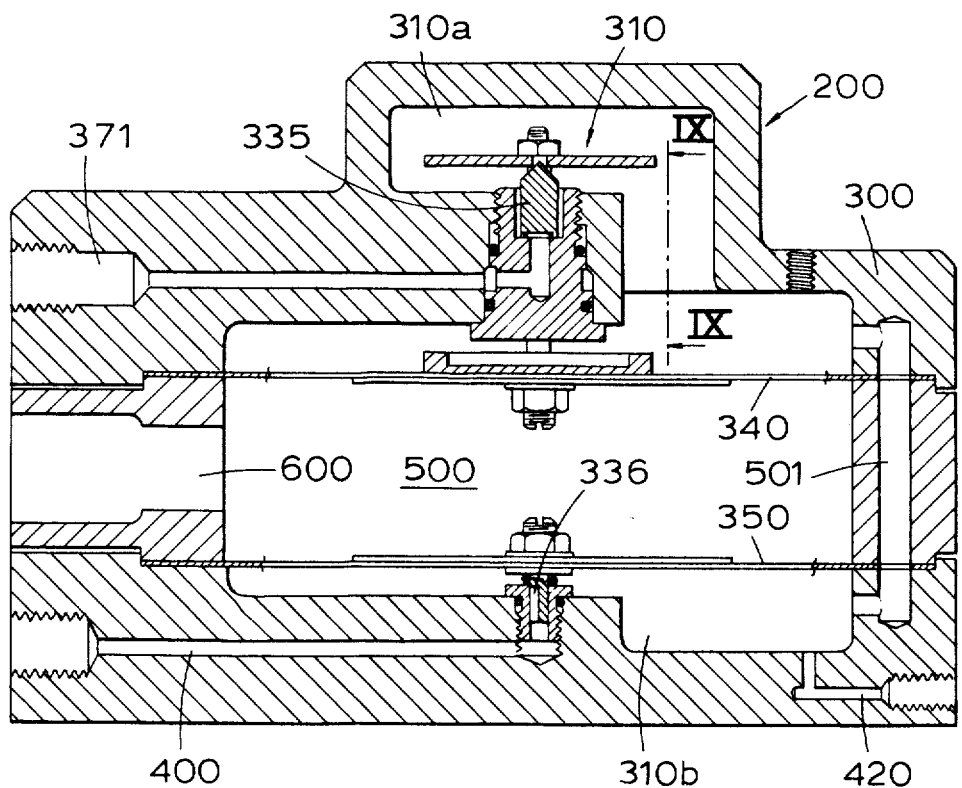
FIG. 8 is a cross-sectional view of a liquid level sensing element according to a second and preferred embodiment of the invention.
Figure 9:
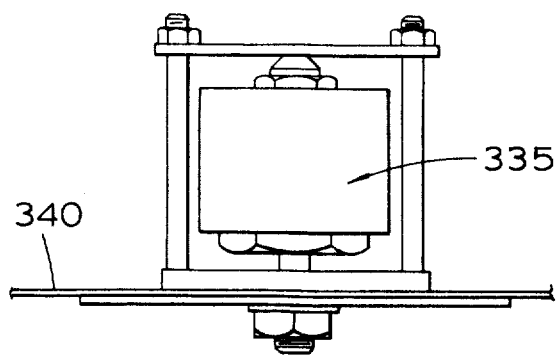
FIG. 9 is a view taken on the lines IX—IX of FIG. 8.
Figure 10:
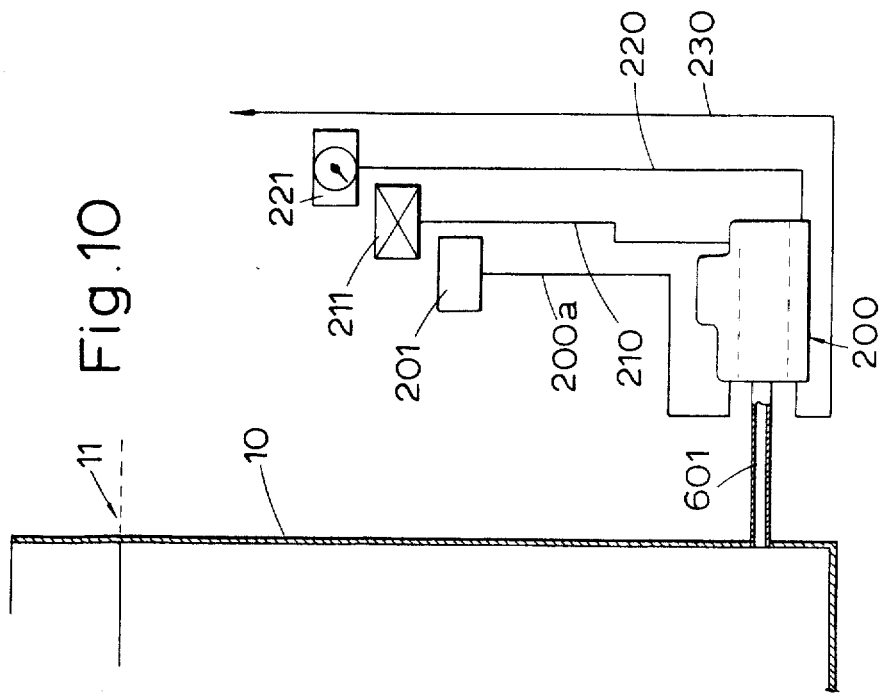
FIG. 10 is a diagramatic representation of a liquid container or tank fitted with a sensing element according to the second embodiment as shown in FIGS. 8 and 9.

Referring now to FIGS. 8, 9, 10 and 11, which illustrate a second embodiment of the present invention, 200 generally represents a sensing element and referring to FIG. 10 such element is located remote from the container 10 having a liquid content whose level is indicated at 11.

Figure 11:
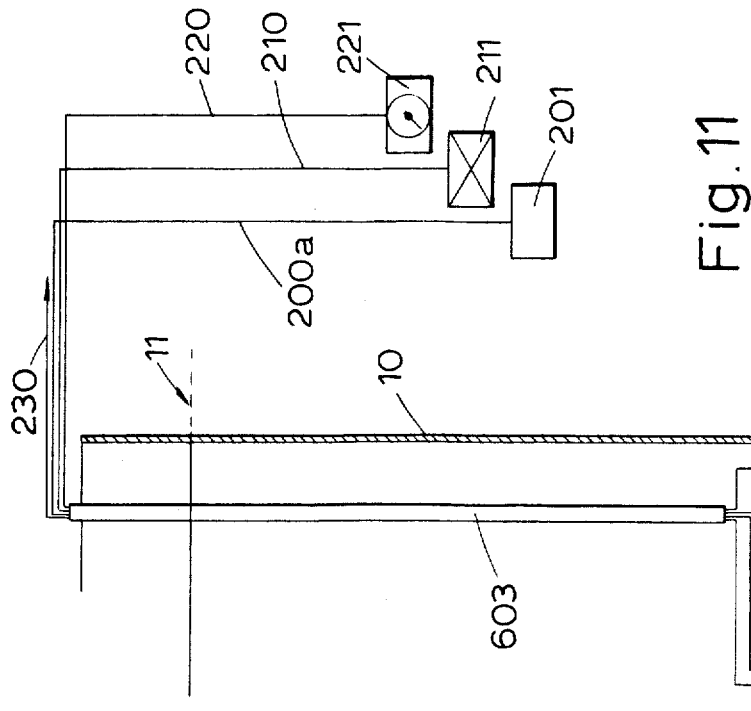
FIG. 11 is a view generally similar to FIG. 10 but with the sensing element fitted inside the container or tank.

In FIG. 11 an arrangement is shown which is generally similar to that shown in FIG. 10, but in this embodiment, the element 200 is mounted inside the container 10.

Referring to FIGS. 8 and 9, the sensing element 200 has a main body portion 300 defining on the one hand an interior gas-filled space 310 and on the other hand a liquid-filled chamber 500. The liquid-filled chamber 500 is bounded in part by the upper diaphragm 340 and in part by the lower diaphragm 350 which respectively separate the liquid-filled chamber 500 from an upper gas-filled space 310a and a lower gas-filled interior space 310b. The upper and lower gas-filled interior spaces are interconnected by a passage 501.

The upper diaphragm 340 is coupled to control an inlet valve generally designated 335 in a similar manner as has been described with reference to FIGS. 1, 2, 5 and 6 where the upper diaphragm 40 is coupled to control the inlet valve generally designated 35.

Similarly the lower diaphragm 350 is coupled to control the operation of an outlet valve generally designated 336.

371 represents an inlet passage-way through which gas under pressure is supplied to inlet valve 335. 400 represents an outlet passage-way leading from outlet valve 336. 420 represents a passage-way to which is connected an air line leading to a pressure indicating means. 600 represents a passage-way leading out of liquid-filled chamber 500.

Referring to FIG. 10, the passage-way 600 is here shown connected to a conduit 601 providing liquid flow intercommunication between the contents of container 10 and the liquid-filled chamber 500.

In FIG. 10, 201 again represents a source of gas under pressure connected by pipe line 200 to the inlet passage-way 371.

221 again represents a gas pressure indicating device connected by a line 220 to the passage-way 420 indicated in FIG. 8.

230 represents a pipe line connected to outlet passage-way 400.

As with the embodiment described with reference to FIGS. 1 to 3, and FIGS. 5 to 7, a relief valve 211 may optionally be provided interconnected by a line 210 to the gas-filled interior space 310.

The arrangement shown in FIG. 11 is similar to that shown in FIG. 10 and like reference numerals are employed for similar components. However, in this embodiment the element 200 is secured by bracket means 602 to the bottom of the container and the various lines 200a, 210, 220 and 230 are lead through a conduit 603 to the top of the container. The conduit may be secured in any convenient manner to the wall of the container 10.

The operation of the device illustrated in FIGS. 8 to 11 is substantially the same as has been hereinbefore described with reference to the embodiment illustrated in FIGS. 1 to 3 and FIGS. 5 to 7.

It will be appreciated that in any of the embodiments of the invention where the sensing element is associated with a liquid container, if the sensing element is located at any pre-determined known level relative to said container and indeed if it is sited at a level considerably lower than that of the container, then by suitable arrangement, adjustment or correction of the reading at the indicating device, an accurate indication of the head of liquid in the container may be obtained.

It will be further apparent that the pressure indicating device may have associated with it transducing means, which may include electronic or hydraulic circuitry of known form, whereby a signal may be transmitted to further indicating means remotely located from the remainder of the measuring installation.

Finally it will be appreciated that in all embodiments, the inlet valve will operate in dependence upon a first pre-determined relationship of pressure across the diaphragm coupled to the said inlet valve, while the outlet valve will operate in dependence upon a second pre-determined pressure relationship across the second diaphragm associated with the said outlet valve.

In all embodiments the two diaphragms are preferably disposed substantially horizontally.

I claim:

1. Liquid level measuring and indicating apparatus including a sensing element having two diaphragms bounding a gas-filled interior space of the element, the two diaphragms being respectively coupled to control the operation of inlet and outlet valves which, in turn, respectively control the supply and exhaust of gas to and from said gas-filled interior space, characterized in that the two diaphragms constitute also at least part of the walls of a liquid-filled chamber in flow communication with a liquid only, the hydrostatic pressure of which is to be measured, and including means interconnecting said gas-filled interior space with a pressure indicating gauge so as to indicate the gas pressure in said gas-filled interior space.

2. Apparatus according to claim 1, wherein the liquid whose level is to be measured is disposed in a container and wherein said sensing element is located at a predetermined known height relative to said container.

3. Apparatus according to claim 2, wherein the sensing element is enclosed in a casing or envelope which together with the sensing element defines the liquid-filled chamber which is in communication only with the liquid, the hydrostatic pressure of which is to be measured.

4. Apparatus according to claim 2, wherein the sensing element is enclosed in a casing or envelope, the interior of said casing being in fluid flow communication only with the interior of the container, the level of whose liquid content is to be measured, so that the hydrostatic pressure of the head of liquid above the sensing element can be transmitted to the interior of the casing and so brought to bear on the two diaphragms.

5. Apparatus according to claim 2, wherein the sensing element has its two diaphragms facing one another, partly to define the walls of a liquid-filled chamber disposed between the diaphragms, which chamber is placed in direct fluid flow communication with the interior of a container, the level of the liquid content of which is to be measured.

6. Apparatus according to claim 5, wherein one diaphragm is located above the other and the upper diaphragm is coupled to the inlet valve which, in turn, controls the supply of gas to the gas-filled interior space, while the lower diaphragm is coupled to control the outlet valve which, in turn, controls the venting of gas from the gas-filled interior space.

7. Apparatus according to claim 6, wherein the inlet valve is located above the upper diaphragm and the outlet valve is located below the lower diaphragm with the gas-filled spaces, respectively, above the upper diaphragm and below the lower diaphragm, being interconnected by air passage means.

8. Apparatus according to claim 1, wherein the sensing element has its two diaphragms facing one another partly to define the walls of a liquid-filled chamber disposed between the diaphragms which chamber has liquid flow intercommunication only with the liquid, the hydrostatic pressure of which is to be measured.

9. Apparatus according to claim 8 wherein one diaphragm is located above the other and the upper diaphragm is coupled to the inlet valve which, in turn, controls the supply of gas to the gas-filled interior space, while the lower diaphragm is coupled to control the outlet valve which in turn controls the exhaust of gas from the gas-filled interior space.

10. Apparatus according to claim 9, wherein the inlet valve is located above the upper diaphragm and the outlet valve is located below the lower diaphragm with the gas-filled spaces, respectively above the upper diaphragm and below the lower diaphragm being interconnected by air passage means.

11. Apparatus according to claim 8, wherein the sensing element is located at a pre-determined known height relative to the liquid whose level is to be measured, and wherein the pressure indicating device is so arranged and adjusted that a substantially accurate measurement of the liquid head in the container can be obtained.

12. Apparatus according to claim 1, wherein the gas-filled interior space is connected by an air line to a gas pressure indicating device.

13. Apparatus according to claim 12, wherein the sensing element is located at a pre-determined known height relative to a container, the level of whose liquid content is to be measured, and wherein the pressure indicating device is so arranged and adjusted that a substantially accurate measurement of the liquid head in the container can be obtained.

14. Apparatus according to claim 1, wherein both diaphragms are disposed substantially horizontally.

15. Apparatus according to claim 1, wherein the height relationship of the two diaphragms is so chosen that an equilibrium pressure exists in the gas-filled interior space, at which no gas passes through both of the inlet and outlet valves.

16. Liquid level measuring and indicating apparatus including a sensing element disposed at a lower level than the surface of liquid to be measured, which comprises in combination:
  a. an enclosure defining an interior space, said enclosure having first and second openings therein,
  b. an inlet passage-way in the enclosure through which gas under pressure may be fed to said interior space,
  c. inlet valve means in the inlet passage-way for controlling supply of said gas under pressure through said inlet passage-way to said interior space,
  d. an outlet passage-way in said enclosure for venting gas from the interior space,
  e. an outlet valve means in the outlet passage-way for controlling venting of said gas from said interior space,
  f. a first diaphragm hermetically closing the first opening in said enclosure,
  g. said first diaphragm operatively connected to said inlet valve means to open and close same for a first pre-determined relationship of interior and exterior pressure on said first diaphragm,
  h. a second diaphragm hermetically closing the second opening in said enclosure, with both said first and second diaphragms bounding in part said interior space,
  i. said second diaphragm being operatively connected to said outlet valve means to open and close same for a second pre-determined relationship of exterior and interior pressures on said second diaphragm, and
  j. a manometric pressure gauge connected to said interior space to indicate the pressure existing therein, with both diaphragms being in effective contact with the liquid whose level is to be measured and subject to pressure therefrom, and wherein the gas pressure in the interior space acting simultaneously on both diaphragms is a measure of the height of the liquid above the sensing element.

17. Apparatus according to claim 16, wherein said measuring and indicating apparatus is mounted in a container, and said first pre-determined relationship comprises a first specified pressure difference of said exterior pressure and said interior pressure, said first specified pressure difference corresponding to a first small head of liquid in the container, and wherein said second pre-determined relationship comprises a second specified pressure difference of said exterior pressure and said interior pressure, said second specified pressure difference corresponding to a second small head of liquid in the container, and wherein the algebraic sum of the liquid head on the diaphragm connected to the inlet valve means plus the first specified small head is not greater than the algebraic difference between the liquid head on the diaphragm connected to the outlet valve means and the second specified small head.

18. Apparatus according to claim 17, wherein said first predetermined relationship comprises a first specified pressure difference of said exterior pressure and said interior pressure, said first specified pressure difference corresponding to a first small head of liquid and wherein said second predetermined relationship comprises a second specified pressure difference of said exterior pressure and said interior pressure, said second specified pressure difference corresponding to a second small head of liquid, and wherein the algebraic sum of the liquid head on the diaphragm connected to the inlet valve means plus the first specified small head is not greater than the algebraic difference between the liquid head on the diaphragm connected to the outlet valve means and the second specified small head.

19. Liquid level measuring and indicating apparatus including a sensing element which comprises in combination:
  a. an enclosure defining an interior space,
  b. an inlet passage-way in said enclosure through which gas under pressure may be fed to said interior space,
  c. inlet valve means in said inlet passage-way for controlling supply of said gas under pressure through said inlet passage-way to said interior space,
  d. an outlet passage-way in said enclosure for venting gas from said interior space,
  e. an outlet valve in said outlet passage-way for controlling venting of said gas from said interior space,
  f. an upper opening in said enclosure,
  g. an upper diaphragm hermetically closing said upper opening in said enclosure,
  h. said upper diaphragm connected to said inlet valve means to open same when exterior liquid pressure on said upper diaphragm approaches gas pressure in said interior space to within a first specified pressure difference and to close said inlet valve when gas pressure within said interior space exceeds external liquid pressure on said upper diaphragm by more than said first specified pressure difference,
  i. a lower opening in said enclosure, j. a second diaphragm hermetically closing said lower opening in said enclosure, with both said upper and lower diaphragms bounding in part said interior space, k. said lower diaphragm connected to said outlet valve means to close same when exterior liquid pressure on said lower diaphragm exceeds gas pressure in said interior space by a second specified pressure difference and to open said outlet valve means when external liquid pressure on said lower diaphragm falls in relation to gas pressure in said interior space to within said second specified pressure difference, and l. a manometric pressure gauge connected to said interior space to indicate the gas pressure obtaining therein.

20. Liquid level measuring and indicating apparatus according to claim 19, wherein said measuring and indicating apparatus is mounted in a container, and said first specified pressure difference corresponds to a first head of liquid in the container, and wherein said second specified pressure difference corresponds to a second small head of the liquid in the container and wherein the diaphragm associated with the inlet valve is spaced above the diaphragm associated with the outlet valve by a height which is at least as great as the sum of the first and second above specified heads.

21. Liquid level indicating apparatus comprising, in combination, a sensing element including an enclosure defining an interior space, the enclosure adapted to be fixedly disposed in a liquid container, an inlet passage in the enclosure for the admission of gas under pressure to said interior space, inlet valve means in the inlet passage and adapted and arranged to control supply of said gas under pressure through said inlet passage to said interior space, an opening in said enclosure, a first diaphragm secured on the exterior of the enclosure across said opening and partially bounding said interior space, means connecting the diaphragm to the inlet valve means to urge the latter to close when the diaphragm flexes so as to increase the volume of said interior space, an outlet passage leading outwardly of the enclosure from said interior space, outlet valve means in the outlet passage arranged to control flow of gas through said outlet passage, a second opening in said enclosure, and a second diaphragm secured on the exterior of said enclosure across said opening and partially bounding said interior space, said second diaphragm connected to the outlet valve means to increase opening of same to permit flow of gas under pressure from the interior space through the outlet passage when the second diaphragm flexes so as to increase the volume of said interior space, and including a manometric pressure gauge connected to said interior space.

22. Apparatus according to claim 21 wherein the first diaphragm has a neutral position at which the inlet valve is closed to prevent gas flow therethrough, at a given head of liquid in the container and a given pressure in the container.

23. Apparatus according to claim 21 wherein said inlet valve means and the diaphragm connected therewith are constructed and arranged to open to admit gas under pressure to the interior space only when the liquid pressure externally of the said diaphragm approaches the gas pressure in said interior space to within a specified amount.

24. Apparatus according to claim 21 wherein the second diaphragm has a neutral position at which the outlet valve is closed to prevent gas flow therethrough at a given liquid head on the second diaphragm and a given gas pressure in the enclosure.

25. Apparatus according to claim 21 wherein said outlet valve means and the diaphragm connected therewith are constructed and arranged to open to allow venting of said interior space through the outlet passage only when liquid pressure acting externally on said second diaphragm falls to within a specified pressure difference of the gas pressure existing within the interior space.

26. Apparatus according to claim 21 wherein the diaphragm and valves are arranged such that for a given head of liquid in the container above the enclosure the pressure in said interior space required to effect opening of said outlet valve means exceeds the pressure in the interior required to allow closure of the inlet valve means.

27. Apparatus according to claim 21, wherein the enclosure is so fixedly disposed in the liquid container that the second diaphragm is located at a lower level than the first diaphragm.

28. Apparatus according to claim 21, wherein the areas and relative dispositions of the two diaphragms and the arrangement of the inlet and outlet valves is such that for a given head of liquid in the container above the enclosure there exists a gas pressure within the enclosure at which both inlet and outlet valve means are closed to prevent flow of gas past the said valve means both to and from the interior space of the capsule.

29. Apparatus according to claim 21, wherein the diaphragms are respectively of polytetrafluoroethylene.

30. Apparatus according to claim 21, including discs disposed to support the central regions of the respective diaphragms.

31. Apparatus according to claim 21, including means for limiting flexion of at least one of the diaphragms beyond a pre-determined degree.

32. Liquid level measuring and indicating apparatus including:

i. a sensing element located in a liquid container,
ii. said sensing element comprising in combination:
   a. an enclosure defining an interior space,
   b. an inlet passage-way in the enclosure through which gas under pressure may be fed to said interior space,
   c. inlet valve means in the inlet passage-way for controlling supply of said gas under pressure through said inlet passage-way to said interior space,
   d. an outlet valve controlling venting of said gas from said interior space,
   e. an upper diaphragm hermetically closing an upper opening in said enclosure and a lower diaphragm hermetically closing a lower opening in said enclosure, with both said upper and lower diaphragms bounding in part said interior space and being in contact with the liquid,
   f. said upper diaphragm being connected to said inlet valve means, to open same when exterior liquid pressure on said upper diaphragm approaches gas pressure in said interior space to within a first specified pressure difference, and to close said inlet valve when gas pressure within said interior space exceeds external liquid pressure on said upper diaphragm by more than said first specified pressure difference, g. said lower diaphragm being connected to said outlet valve means to close same when exterior liquid pressure on said lower diaphragm exceeds gas pressure in said interior space by a second specified pressure difference and to open said outlet valve when external liquid pressure on said lower diaphragm falls in relation to gas pressure in said interior space to within said second specified pressure difference, h. and including a manometric pressure gauge connected to said interior space to indicate the gas pressure existing therein.

33. Apparatus according to claim 2 wherein the sensing element is located outside and remote from the container when its liquid-filled chamber is in liquid flow communication with the liquid contained in said container only.

* * * * *